P. J. SKINNER.
Lamp-Wick Tag.
No. 107,299.  Patented Sept. 13, 1870.
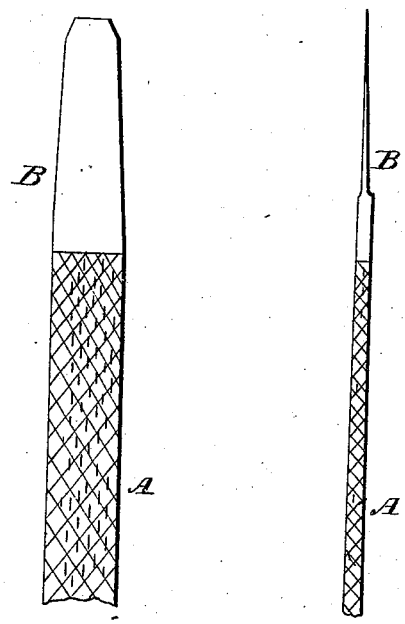
Witnesses:
W. C. Ashketett
Wm. A. Morgan
Inventor:
P. J. Skinner
per Munn & Co.
attorneys

United States Patent Office.

P. J. SKINNER, OF OSWEGO, NEW YORK.

Letters Patent No. 107,299, dated September 13, 1870.

IMPROVEMENT IN LAMP-WICKS.

The Schedule referred to in these Letters Patent and making part of the same.

*To all whom it may concern:*

Be it known that I, P. J. SKINNER, of Oswego, in the county of Oswego and State of New York, have invented a new and improved Lamp-wick Tag; and I do hereby declare that the following is a full, clear, and exact description thereof, which will enable those skilled in the art to make and use the same, reference being had to the accompanying drawing forming part of this specification.

The object of this invention is to provide convenient means for introducing the wicks of lamps into the wick-tubes; and It consists in attaching a tag formed of pasteboard or paper, or some equivalent substance, to one end of the wick, so that the same shall be more rigid than the wick, and be readily introduced into the tube, as I will proceed to describe.

The drawing (Figure 1) is a side view of a longitudinal section of a lamp-wick, showing the tag attached.

Figure 2 is an edge view of the same.

Similar letters of reference indicate corresponding parts.

A represents the wick of the lamp, and B represents the tag attached thereto.

The lamp-wick is of the ordinary kind, of braided or woven cotton, or other suitable textile or fibrous material.

The tag B is made of paper or other suitable material, which is either wrapped around the end of the wick, or attached thereto in such a manner that it may readily and easily be passed through the wick-tube, thus greatly facilitating the operation, and saving much time and trouble.

The tag may be attached with mucilage or cement, or in any other suitable manner, the object being, as before stated, to furnish the wick with a more rigid end for the purpose mentioned.

Having thus described my invention,

I claim as new and desire to secure by Letters Patent—

The tag B, attached to a lamp-wick, and in combination therewith, substantially as and for the purpose described.

P. J. SKINNER.

Witnesses:
RICHARD DONOVAN,
CHARLES H. TIFFT.